May 18, 1948.   J. R. FLEISCH   2,441,876
RING AND DISC ASSEMBLY APPARATUS
Filed Jan. 15, 1945   5 Sheets-Sheet 1

Inventor:
Joseph R. Fleisch
By: A. Trevor Jones
Atty.

Inventor:
Joseph R. Fleisch
By: A. Trevor Jones
Atty.

Patented May 18, 1948

2,441,876

UNITED STATES PATENT OFFICE 2,441,876

RING AND DISC ASSEMBLY APPARATUS

Joseph R. Fleisch, Hinsdale, Ill.

Application January 15, 1945, Serial No. 572,876

15 Claims. (Cl. 29—211)

This invention relates to ring and disc assembly apparatus and the invention finds particular application for the mechanical assembly of the closure discs or lids of two-piece mason jar caps for home canning use or the like with the rings or bands which are commonly screw threaded to clamp the lid to the jar.

In the merchandising of such goods it is desirable that a given quantity such as say a dozen of the two-piece caps be placed together in a package for sales distribution and it is important that there be a lid for each band, and vice-versa, in the package, to avoid waste and annoyance. Heretofore it has been customary in the plant of the cap manufacturer to count out twelve bands and twelve lids for disposal in the package, but such manual operation is slow and expensive and also unreliable in that frequently a band fails to have a lid therefor, or vice-versa.

The present invention aims to provide a high speed mechanical apparatus for performing the assembly operation immediately as the cap parts are delivered from the manufacturing machinery and which will keep step with the production of the cap parts while eliminating the need for manual labor for this purpose and insuring accuracy of count.

These and other objects will be apparent from the following description, taken together with the accompanying drawings, setting forth an illustrative embodiment of the invention, and in which drawings—

Figures 1, 1A, 1B:
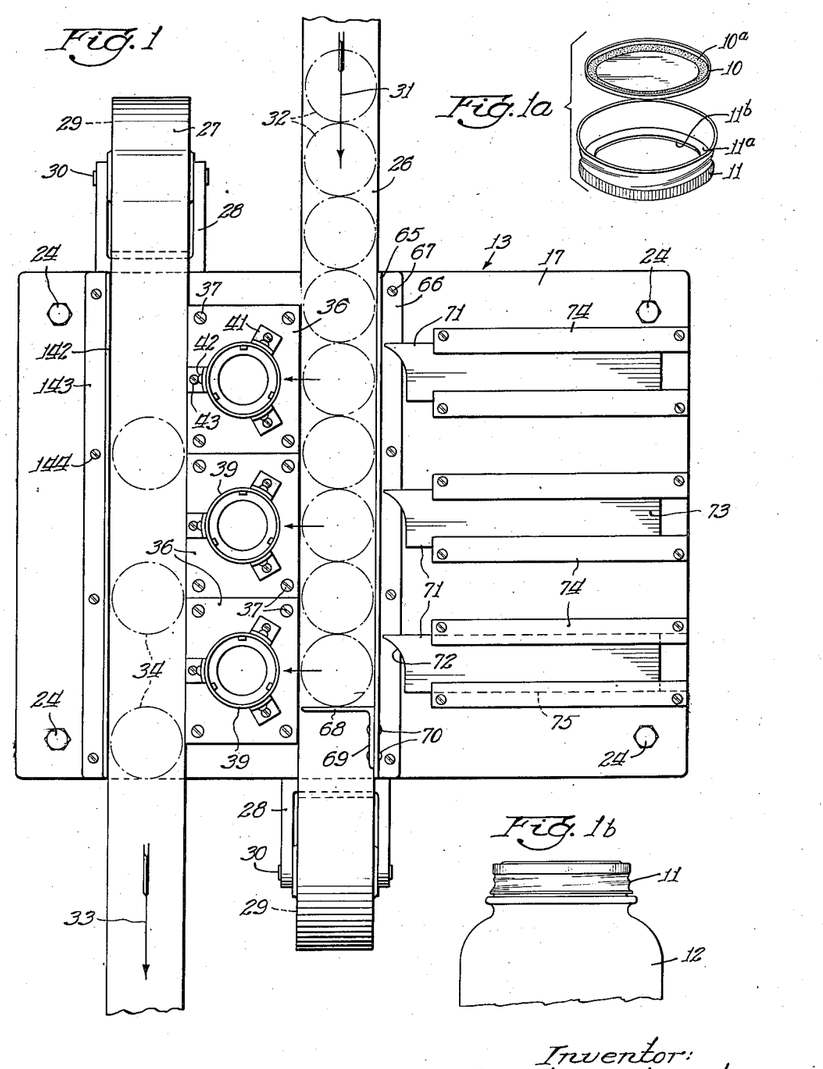
Figure 1 is a plan view of apparatus embodying the present invention.
Figure 1a is a perspective view showing in separated relation the disc-shaped lids and the ring-shaped bands upon which the apparatus may operate for assembling pairs of these.
Figure 1b is a partial view of a mason jar with the closure thereon.

Referring in detail to the illustrative construction as shown in the drawings and turning first to Figure 1a, the numeral 10 indicates the disc-shaped lid and the numeral 11 the ring-shaped band of a composite closure for jars as for the preserving of home cooked fruits, vegetables and the like. These lids and bands are commonly sold in sets of pairs comprising a disc-shaped lid and a ring-shaped band in a pair constituting a closure and are used by the housewife or other packager to close and seal a receptacle as the jar 12 (Fig. 1b). Figure 1a shows the band and lid in upside-down position, whereas Figure 1b shows the band and lid in right-side-up position on the jar 12, the lid 10 serving as the closure itself by covering the mouth of the jar, usually of glass, and the band 11, which is screwed thereto to mate with similar threads on the exterior of the mouth of the jar, serves to hold the lid in position and seal it thereon, a gasket 10a of rubber-like compound being commonly carried by the lid about the margin of its lower face. The band is somewhat cup-shaped having a horizontal inturned flange 11a about its upper margin which surrounds a circular opening 11b therein, the flange pressing the lid against the jar mouth.

The lids and bands, which are commonly of sheet metal, are separately manufactured by the use of high speed machinery for that purpose and are brought together for packing for shipment to the purchaser usually in packages each containing a dozen bands and a dozen lids, and the application of the present invention here specifically illustrated provides rapid, sure and economical means for assuring that there shall be a lid for each band, and a band for each lid. In carrying out the invention the apparatus as next described may advantageously be employed, which contemplates means for positioning a band or plurality of bands in inverted position, and then causing a single lid to be deposited in the band, and then discharging the assembled pairs of lids and bands for packaging.

In this instance, a support such as the stand 13 is provided which may have a base 14, a frame comprising a pair of legs 15 at one end and another pair of legs 16 at the other end, and a table top 17. Cross struts 18, 19 and 20 may connect the legs 15 and similar cross struts 21, 22 and 23 connect the legs 16. The table top 17 may be secured to the legs as by bolts 24, the legs having horizontally extending flat lugs 25 at their upper ends through which the bolts pass at each corner of the table, the legs being desirably of angle formation as shown, for enhanced stability.

In accordance with the present invention, the stand 13 supports one end each of two endless belt conveyors 26 and 27 made of the usual canvas belting, the belt 26 for moving over the table top a procession of the bands before assembly with the lids, and the other belt 27 for carrying therefrom a procession of assembled bands and lids. The ends of the conveyors may be entrained on rollers mounted on brackets 28, the rollers 29 being journaled for rotation in the brackets as at 30, one bracket and its roller being mounted on the cross strut 18, for the belt 26, and the other bracket and its roller being mounted on the cross strut 21, for the belt 27, and thus being at opposite ends of the table top 17 and so that the belt conveyors may have their upper runs traveling on the surface of the table top 17 and their lower runs returned below the table top and below the cross struts 18 and 21.

The upper run of the conveyor belt 26, which brings the bands to the apparatus, travels in the direction of the arrow 31 and the procession of bands travels as at 32 thereon in this direction. Similarly the upper run of the conveyor belt 27 also moves along the table top 17 but spaced laterally thereon from the conveyor belt 26 and also travels in the same direction as indicated by the arrow 33, a procession of assembled pairs of bands and lids traveling thereon being indicated at 34. It will be understood that the other ends of the conveyor belts 26 and 27, which are not here shown and which form no part of the present invention, may be conventionally supported and arranged on any suitable mountings and that these conveyor belts may be driven at their ends not here shown by any suitable conventional driving means for that purpose.

Figure 6:
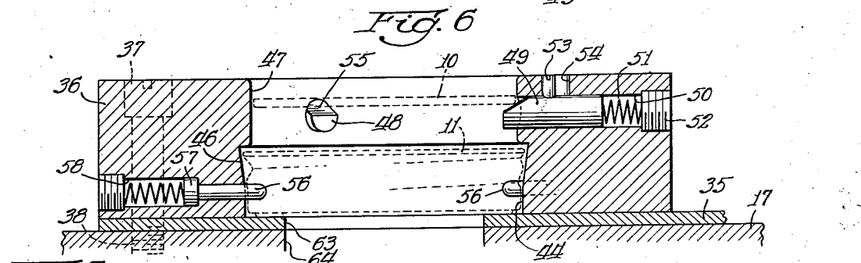
Figure 6 is a vertical section on the scale of Figure 5 taken on the line 6—6 of Figure 5.

Further in accordance with the present invention, between the conveyor belts 26 and 27, the table top 17 carries a filler plate 35 which is of the same thickness as the thickness of the belts 26 and 27 which thereby provides a surface in the same plane with the plane of the upper surface of the belts so as to permit the bands and lids to be slid, as presently described, from one to the other of these surfaces. Upon the filler plate 35 is fixed, in this instance a plurality of, and as here shown, three turret blocks 36 which are secured as by screws 37 at each corner of a block to the table top 17 through suitable perforations which extend through the turret blocks and also through the filler plate 35 to be received in suitable threaded registering perforations in the table top as indicated at 38 (Fig. 6).

From each of the turret blocks 36 rises a chute-like cylindrical magazine 39, this magazine being open at both ends to permit a supply of the lids 10 to be received therein and to drop therethrough, its inner diameter being just slightly larger than the lids. Elongate sight openings 40 in the front faces of the magazines 39 permit visualization of the progress of the lids therethrough and indicate when the magazines are approaching depletion so that a new supply of lids may be placed in the magazines through their open tops. Each magazine may be firmly secured in upright position to its respective turret block 36 as by angle bars 41, in this instance three, which have their uprights screwed to the magazine wall as at 42 and their horizontals screwed to the turret block as at 43.

Each turret block is tunneled by having its lower face, which rests on the filler plate 35, cut away upwardly throughout the width of the block to provide a passageway 44 therethrough of just sufficient size to pass a band 11 therethrough. The passageway 44 is flared slightly as at 45 to facilitate entry of the band into the passageway and is also slightly enlarged as at 46 to accommodate the larger diameter of the band at its lower edge, which, however, is temporarily its upper edge as it moves through this passage in inverted position (see particularly Figs. 4 and 6), to be temporarily stationed under the magazine.

The turret block 36 is also circularly apertured as at 47 which aperture registers with and is of the same diameter as the inner diameter of the magazine 39, the aperture 47 thus providing communication between the interior of the magazine and the passageway 44 through which the bands 11 are slid, and thus permitting a lid 10 to be dropped from the supply in the magazine into one of the inverted bands as it travels through and is temporarily stationed in the passageway.

Figure 4:
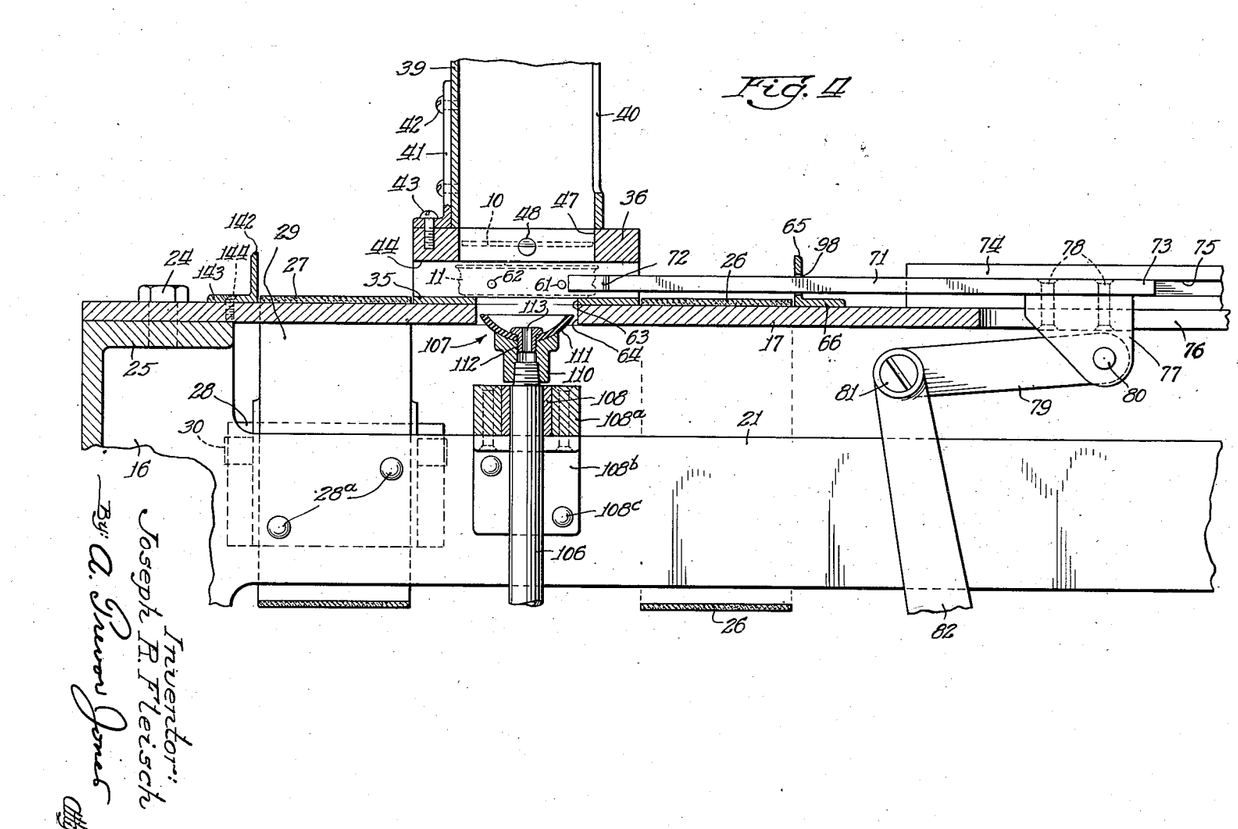
Figure 4 is an enlarged view looking in the same direction as Figure 2 but with the parts in alternative position and certain parts being in section for clearness of description.
Figure 5:
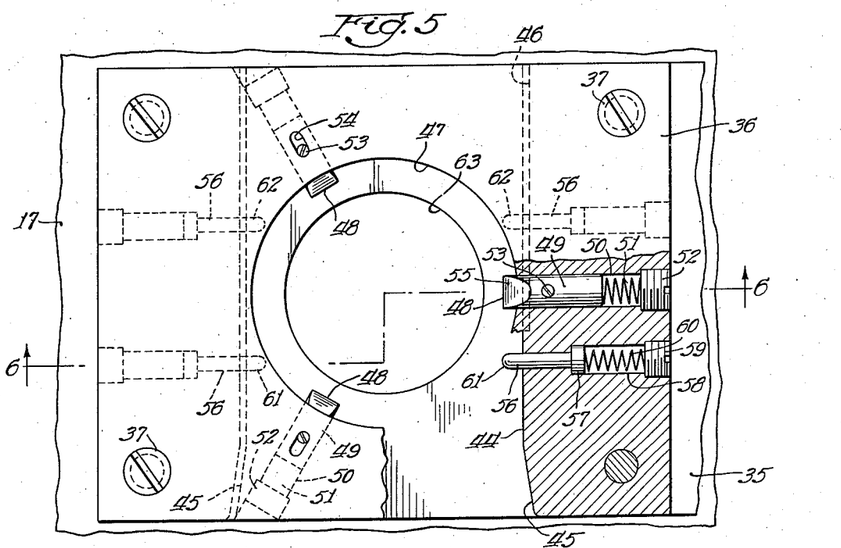
Figure 5 is a still further enlarged fragmentary plan view and being a section taken on the line 5—5 of Figure 3, parts being further cut away for clearness of description.

To retain the columns of lids in the magazines until they are caused to drop one by one, as later more particularly described, the lids are held in each magazine by yielding means such as the spring detents 48, in this instance three in number, which are spaced apart around the circumference of the magazine and which have cylindrical shanks 49 slidable in bores 50 radially drilled in the turret block 36. The bore 50 extends through the block from the aperture 47 to the outer edge of the block and also receives a compression coil spring 51 behind the detent, the (enlarged) outer end of the bore being tapped to threadedly receive a set screw 52 to close the bore, the spring 51 thus urging the detent 48 centrally of the aperture 47. To limit movement of the detent 48 in the bore 50, the detent carries a screw stud 53 which plays in a slot 54 in the turret block, and this arrangement also prevents rotation of the detent, the upper outer end of which is beveled as at 55 to carry the lowermost lid in the magazine thereon, as best shown in Figs. 4 and 6, just the edge of the lid so resting.

Below the detents 48 and extending into the passageway 44 just below the aperture 47, each turret block 36 carries another set of spring fingers 56, in this instance four in number, each spring finger 56 is in the form of a cylindrical plunger having an enlarged inner end 57 that plays in a bore 58 in the turret block, the outer end of the bore being counter-bored to receive a set screw 59 to retain therein a compression coil spring 60 which urges the spring finger 56 inwardly of the passageway 44. The limit of movement of the spring fingers 56 inwardly is such that their inner ends are substantially tangent with a circle described by the aperture 47, so that when a band 11 is slid under this aperture 47, the band, being somewhat larger in diameter than the aperture 47, will first retract slightly the two spring fingers 56 which are nearest the flared entrance 45 of the passageway 44 (which two fingers are here given the further numeral 61) and thus permit the band to pass by these two fingers 61. Thereupon these fingers 61 will spring inwardly again to inhibit retrogressive movement of the band which has just passed. The other two spring fingers 56 (to which the further numeral 62 is given) act as stops to inhibit further movement of the band and the band is thus yieldingly held by these four spring fingers 56 directly beneath the aperture 47 and with the perforation 11b of the band also in register vertically with similar perforations 63 and 64 in the filler plate 35 and table top 17 respectively. The ends of the spring fingers 56 are desirably rounded so as to be cammed by the band both in the movement of the band into the space between the spring fingers and later in its ejection therefrom by a next succeeding band as later more particularly described.

Figure 3:
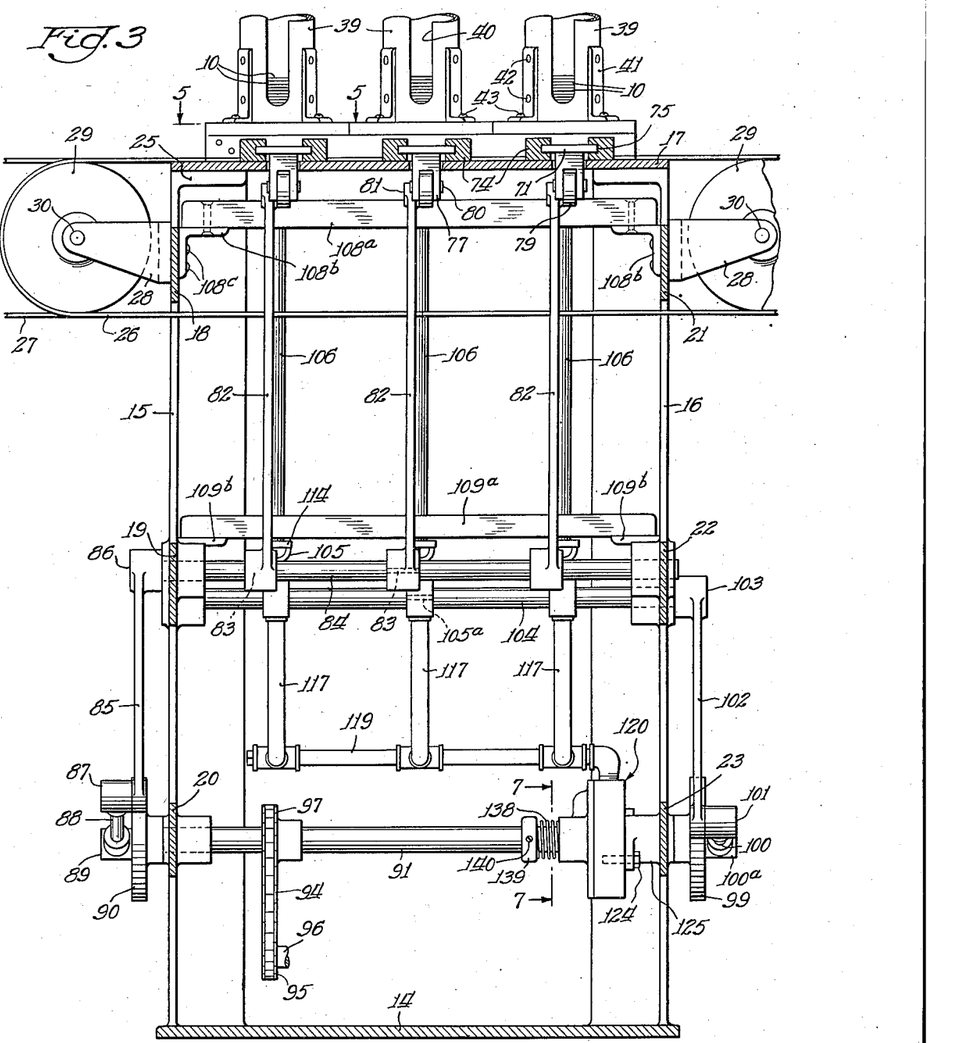
Figure 3 is a sectional view, partly in elevation, taken on the staggered line 3—3 of Figure 2 and being in general a side elevational view of the apparatus.

Turning now to the means for feeding the bands 11 to positions beneath the magazines 39, it will be seen that as the procession 32 of bands 11 reaches the table top 17 the bands are somewhat fenced in by the short upright 65 of an angle guide strip 66 screwed as at 67 to the table top 17 adjacent one edge of the conveyor belt 26 and the bands are finally stopped in their movement on the conveyor, at a position abreast of the magazines, by a stop member 68 of an angle 69 which may be riveted as at 70 to the upright 65 of the angle 66. It will be understood that stop member 68 overcomes the frictional drag of the belt on the bands and that those that are thus brought to a stand-still by the stop member 68 similarly bring to a stand-still the bands following which are in contact one with the other while farther back on the conveyor 26 those that are not in contact are continued to be moved forward toward the stop 68 by the constantly moving belt. As is best seen from Figs. 1 and 3, the magazines 39 are spaced apart center to center a distance equal to the distance between the centers of alternate bands on the conveyor 26, when a procession of the bands is brought to a stand-still by the stop 68. Thus there is a band positioned directly abreast of each of the turret passageways 44 and ready to be slid into these passages, one beneath each magazine.

For accomplishing this latter function automatically, a plurality of feeders such as the slide pushers 71 are provided one opposite each band which is abreast of a magazine and aligned with the band and the passageway 44. Each slide pusher 71 is a plate-like member having a somewhat arcuate retuse nose 72 conforming somewhat to the rounded perimeters of the bands and having a shank 73 which slides in a pair of guide gibs 74, each gib being grooved as at 75 to provide a sliding tongue and groove connection between the gib and pusher. Centrally between each pair of gibs 74, the table top 17 has an elongate slot 76 therein in which plays a lug 77 riveted as at 78 to the pusher 71. A link 79 is articulated at one end as at 80 with the lug 77, which is shown bifurcated to receive the link, and at its other end as at 81 with a slide lever 82 which is keyed as at 83 to a rock shaft 84 carried by the cross struts 19 and 22 of the stand 13 intermediate of the height of the stand.

The jack or rock shaft 84 is thus common to all of the slide levers 82 and is oscillated, to operate the pushers 71, by a crank lever 85 keyed to the jack shaft 84 outside the stand frame as at 86 and articulated at its lower end as at 87 with a pitman 88 eccentrically articulated as at 89 with the crank disc 90 of the cam shaft 91. The cam shaft 91 is the main drive shaft of the apparatus. The shaft 91 is journaled in the cross struts 20 and 23 and may be driven by an electric motor 92, which may be supported on the base 14 which also forms the base for the stand 13 and the motor may be connected as at 92a with a speed reducer 93. A drive chain 94 is shown entrained over a gear pinion 95 fixed to the output shaft 96 of the speed reducer and meshing with a sprocket 97 pinned to the drive shaft 91.

The cam shaft 91 may be arranged to rotate at considerable speed, say 125 revolutions per minute and thus the slide pushers 71 will be actuated toward the magazines 39 the same number of times per minute. Since there are three of these slide pushers in this instance, 375 bands per minute will be positioned beneath the magazines.

Figure 2:
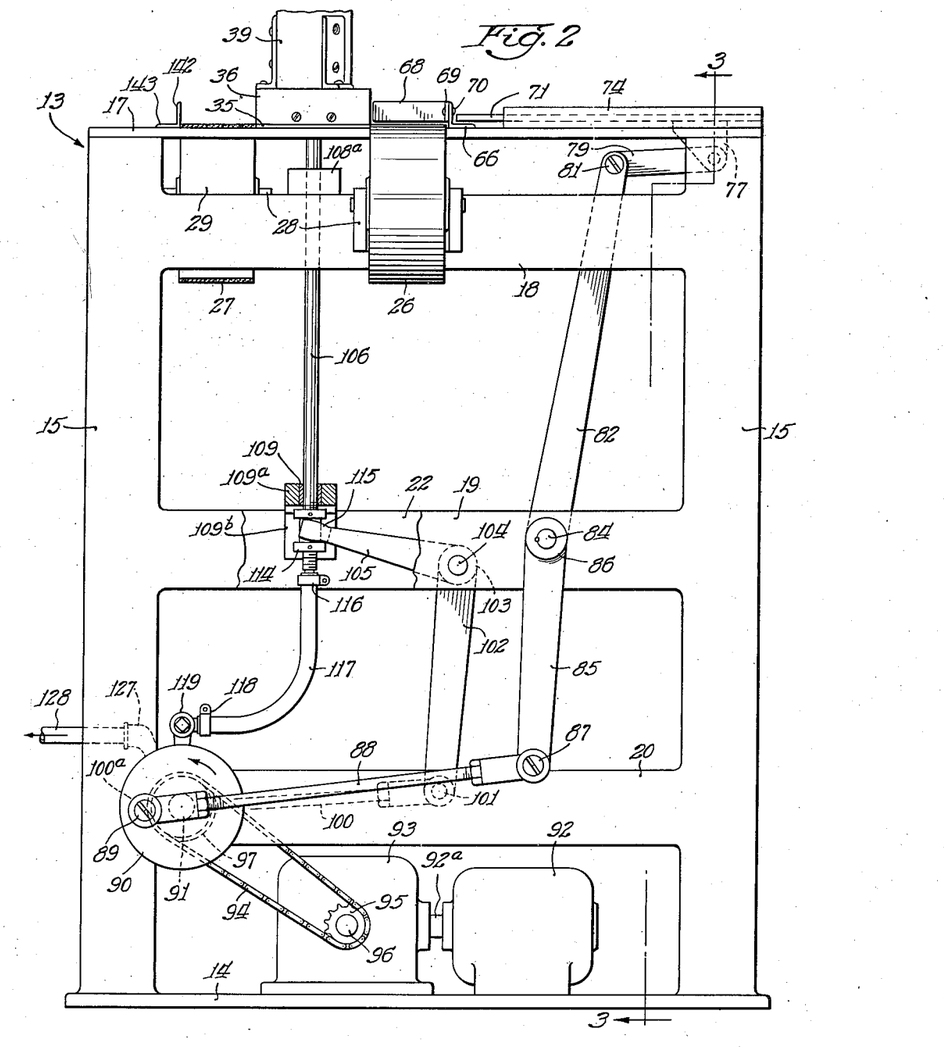
Figure 2 is an elevational view of the apparatus of Figure 1.

In Figs. 1 and 2 the pushers 71 are shown in retracted positions in the cycle of operation, and, at this point in the cycle, the procession 32 of bands 11 is continuous on the belt 26 over the table top 17. When however in the next half cycle of revolution of the crank disc 90, the slide pushers are moved toward the magazines (slots 98 in the upright 65 of the strip 66 admitting the noses of the slide pushers therethrough) the band 11 between each magazine and its registering slide pusher will be slidingly pushed off the conveyor belt 26 onto the surface of the filler plate 35 within the passageway 44 in the turret block 36, as shown in Fig. 4. The slide pusher is of such length that at the extreme limit of its stroke in this direction the pusher will cease to push the band when the band is positioned between the spring fingers 56, and the pusher will then, during the next half cycle of revolution of the crank disc 90, return to its retracted position, whereupon the conveyor belt 26 will again fill up with a continuous procession of the bands, those bands intermediate the ones just pushed by the pushers being moved up to fill the empty spaces left by the bands which were so pushed.

During the half cycle of rotation of the crank disc 90 when the pushers 71 are retracted and the conveyor belt 26 on the table 17 is filling up with bands, the three bands located beneath the magazines 39 are in position to have lids dropped therein respectively, and this is accomplished in accordance with the present invention by automatic means next more particularly described and which comprises a make and break suction device also desirably operated by the cam shaft 91.

As here shown, the cam shaft 91 may carry at its end opposite the crank disc 90 another crank disc 99 pinned thereto outside the opposite end of the stand frame. Eccentrically articulated with the crank disc 99 at 100a is another pitman 100 which is articulated at 101 with a crank lever 102. The latter is keyed as at 103 to another jack or rock shaft 104 also journaled in the cross struts 19 and 22 of the stand frame. This rock shaft 104 is common to a plurality of lifter arms 105, in this instance three. Each lifter arm 105 is keyed to the rock shaft 104 as at 105a and is loosely connected with a stem 106 of a vacuum cup 107. Each stem 106 is vertically reciprocal in a pair of vertically spaced apart bearings 108 and 109 carried respectively by the stand frame and it has limited vertical movement therein.

The bearings 108 are here shown carried by a common bearing block 108a riveted to and supported by a pair of brackets 108b which are in turn riveted to as at 108c and supported by the cross struts 18 and 21, respectively, of the stand frame. Similarly the bearings 109 are carried by a common bearing block 109a similarly riveted to and supported by a pair of brackets 109b, riveted to and supported by the cross struts 19 and 22 respectively.

Each vacuum cup 107 may comprise a nipple 110 threadedly secured to the upper end of the stem 106 and having a passage therein to register with the interior of the stem and also with a center perforation in a rubber-like diaphragm 111 which is clamped to the spherically concave upper face of the nipple 110 by a clamping screw 112 perforated as at 113 and arranged to conform the diaphragm to this cup shape. A suction cup is thus provided communicating with a valving system next described.

Adjacent its lower end and below the bearing 109 the stem 106 has pinned thereto a double flanged yoke collet 114 and the lifter arm 105 is forked at its end 115 to interengage with the yoke collet 114 so as to alternately lift and depress the vacuum stem 106 as the rock shaft 104 is oscillated by the drive shaft 91. Below the yoke collet 114 each stem 106 has connected thereto as at 116 a flexible hose 117 which at its other end 118 is connected with a pipe header 119 supported by and communicating with a stationary air valving member 120, which has a tapped aperture 121 therein threadedly receiving the pipe 119. The threaded aperture 121 is in communication as by the bore 122 with a port 123 in the face 120a of the stationary valving member 120, the latter being bolted as at 124 to a cylindrical bracket 125 suitably secured to the cross strut 23 of the stand frame, the cam shaft 91 passing rotatively through the stationary valving member 120 and the cylindrical bracket 125. The stationary valving member 120 is also threadedly apertured as at 126 to receive a pipe-fitting 127 for a pipe 128 which may be connected to any suitable vacuum pump which need not be here more specifically described. The aperture 126 communicates as by a bore 129 with another port 130 in the face 120a of the stationary valving member 120, circumferentially spaced therein from the port 123.

For face to face rotative close fitting abutment with the stationary valving member 120 is another rotary valving member 131 which is keyed as at 132 to the cam shaft 91. The rotary valving member 131 carries, in its face 131a which revolvably abuts the face 120a of the stationary valving member, an arcuately and circumferentially elongated manifold portion 133 the interior 134 of which is adapted to place in communication the ports 123 and 130 so as to create a suction within the stems 106.

Close face to face contact of the relatively rotary valving member 131 with the stationary valving member 120 may be effected by a relatively heavy compression coil spring 138 encircling the cam shaft 91 and pressing at one end against the rotary valving member 131 and at its other end against a collar 139 on the cam shaft 91, the location of which on the shaft is adjustable, as by a set screw 140, to vary the load of the spring 138.

As shown by the drawings, the system of cranks and levers here illustrated and just described is arranged so that during the half cycle of rotation of the crank discs 90 and 99 when the pushers 71 are retracted, the vacuum cups 107 are elevated to pass upwardly through registering perforations 64 and 63 in the table top 17 and filler plate 35 respectively, then upwardly through the center opening 11b in the band 11 and into contact with the lowermost lid 10 in the magazine 39. Since at this time also the manifold 134 of the rotary valve member 131 places the ports 123 and 130 in communication, air is exhausted from the vacuum cups and a suction is created which causes the lowermost lid in the magazine to be adhered to the suction cup 107. As the cycle now progresses the vacuum cups begin their downward stroke and draw with the lowermost lid in each magazine from the stack of lids therein, this suction being sufficient to overcome the load of the springs 50 and to cause the spring detents 48 to be cammed outwardly of the aperture 47 in the turret blocks 36 so as to release the lowermost lid from each stack. The beveled surface 55 of the spring detent facilitates such camming action. Thereupon immediately the lowermost lid has been drawn from the stack, the spring detents 48 snap inwardly of the aperture 47 and support the stack of lids with the next lowermost lid resting thereon.

Figures 7, 8:
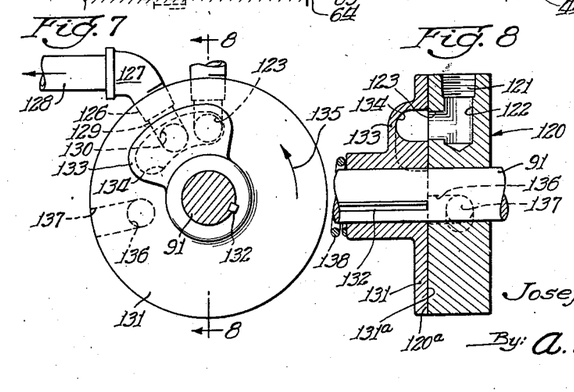
Figure 7 is a somewhat skeleton view of the vacuum valving means and being a section taken on the line 7—7 of Figure 3 somewhat enlarged.
Figure 8 is a cross-section taken on the line 8—8 of Figure 7.

A single lid is thus dropped into the single band which is temporarily stationed thereunder in the passageway 44 waiting to receive it, and, as the cycle continues, the rotary valving member rotating in the direction of the arrow 135 (Fig. 7), the interior of the manifold 133 places the port 123 in communication with another port 136 in the stationary valving member 120 spaced arcuately of the ports 123 and 130. The port 136 communicates with a bore 137 in the stationary valving member 120 which is open to the atmosphere and thus the suction in the header 119 and consequently in each of the vacuum cups 107 is broken and air is admitted into the interiors of the cups which releases the lids from the cups. The three lids so dropped therefore remain in the three bands stationed thereunder while the vacuum cups continue downwardly with the stems 106 respectively under the influence of the cam disc 99 and its associated lever system. The ports are desirably arranged so that the vacuum is broken well before the lid contacts the band so that at the latter time the lid is free of the suction cup and completes its drop under the influence of gravity.

Repeating the cycle, the pushers 71 now move inwardly again and push another band 11 into each of the stations of the three passageways 44, the incoming bands pushing ahead of them the bands already in the passageways, into which a lid has been dropped, out through the rear end of the passageway 44 and onto the discharge conveyor belt 27, the two rearmost spring fingers 56, which are here given the further designating numeral 62, yielding for this purpose. As this pair of two rearward spring fingers 62 of the spring fingers 56 spring inwardly again upon the passage of the pushed band and lid therebeyond, the return force of the spring fingers kicks the band and lid and gives it an added push in the discharge direction which carries it well onto the discharge conveyor belt 27. To prevent the discharge assembled bands and lids from being kicked beyond the conveyor belt 27, the latter may be margined along its rear edge by the upright 142 of a stop strip 143 which may be secured as by screws 144 to the table top 17.

So constructed and arranged the procession 34 of pairs of assembled bands and lids, each pair comprising one band 11 and one lid 10 therein, is automatically produced for packaging at a high speed of assembly and with a minimum of labor and a maximum of accuracy, the conveyor 27 leading to any suitable manual or mechanical packing means.

It is to be understood that the words "ring" and "disc" are here used in the broadest sense, the word "ring" to include any article having an opening therethrough, whether circular or noncircular through which an assembly element may be passed, the word "disc" to include any article to be deposited therein, whether circular or noncircular, and which can be stacked for such purpose.

It is moreover to be understood that the invention is not intended to be limited to details of structure and operation which are intended to be exemplary, and, furthermore that it may not be invariably essential that all features of the disclosure be used conjointly, since various combinations or sub-combinations of the structures disclosed may at times be advantageously employed.

What is here claimed is:

1. In ring and disc assembly apparatus, the combination with ring and disc feeding mechanisms wherein the ring feeding mechanism is mounted in a horizontal plane and the disc feeding mechanism is mounted in a vertical plane and a ring is positioned beneath and aligned with a supply of vertically disposed discs and wherein a vacuum cup is elevated through the ring to engage the lowermost disc in said supply and cause it to drop into said ring.

2. In ring band and disc lid assembly apparatus, the combination of a stand providing a supporting frame and a table top, a plurality of magazines for disc lids mounted above the table top, a feed conveyor traveling over the table top for bringing ring bands to positions adjacent the magazines, a plurality of pushers for pushing simultaneously a plurality of bands from the feed conveyor to stations respectively beneath the magazines, a plurality of vacuum cups carried by the frame and adapted to reciprocate upwardly vertically therein beneath said stations and through the bands to engage a lowermost lid and then downwardly vertically to draw the lid to the band, a system of levers carried by the frame for simultaneously reciprocating the pushers horizontally, another system of levers carried by the frame for simultaneously reciprocating the vacuum cups vertically, means for making a vacuum in the cups in the vicinity of the upward limit of their movement, means for breaking said vacuum in the vicinity of the lower limit of said movement, and means for actuating said levers and vacuum means.

3. In ring and disc assembly apparatus, the combination with a stand providing a supporting frame, a plurality of pushers carried by the frame, a plurality of vacuum cups carried by the frame, and a plurality of systems of levers carried by the frame for reciprocating the pushers and vacuum cups respectively, comprising, a common cam shaft journaled in the frame, a pair of crank discs pinned to said cam shaft, a pitman eccentrically articulated with each crank disc and connected for actuating of each of said systems of levers respectively, a stationary valving member encircling the cam shaft, a rotary valving member pinned to the cam shaft in face to face abutment with the stationary valving member, a system of ports in said valving members jointly for intermittently connecting said vacuum cups with a source of vacuum and for discontinuing said connection, and means for driving said cam shaft.

4. In ring and disc assembly apparatus, the combination with a table top, of a magazine for disc lids mounted above the table top, a feed conveyor traveling over the table top for bringing ring bands to a position adjacent the magazine, a pusher for pushing a band from the feed conveyor to a station beneath the magazine, and a vacuum cup arranged to reciprocate vertically beneath the magazine wherein the magazine rests upon a tunneled turret block having a passageway therein for a band, wherein spring fingers yieldingly retain the band therein for temporary stationing to receive a lid, and wherein the turret block is apertured intersecting said passageway and in vertical register with the lids and said table top is also apertured in such register to permit the vacuum cup to pass vertically upward through said apertures and band into contact with the lid.

5. In ring band and disc lid assembly apparatus, the combination of a support, a magazine for disc lids mounted above the support, a feed conveyor traveling over the support for bringing ring bands to positions adjacent the magazine, a pusher for pushing bands from the feed conveyor to a station beneath the magazine, a vacuum cup carried by the frame and adapted to reciprocate upwardly vertically therein beneath said station and through the band to engage a lowermost lid and then downwardly vertically to draw the lid to the band, means carried by the frame for reciprocating the pusher horizontally, means carried by the frame for reciprocating the vacuum cup vertically, means for making a vacuum in the cup in the vicinity of the upward limit of its movement, means for breaking said vacuum in the vicinity of the lower limit of said movement, and means for actuating said means.

6. In ring band and disc lid assembly apparatus, the combination of a stand providing a supporting frame and a table top, a plurality of magazines for disc lids mounted above the table top, a feed conveyor traveling over the table top for bringing ring bands to positions adjacent the magazines, a plurality of pushers for pushing simultaneously a plurality of bands from the feed conveyor to stations respectively beneath the magazines, a plurality of vacuum cups carried by the frame and adapted to reciprocate upwardly vertically therein beneath said stations and through the bands to engage a lowermost lid and then downwardly vertically to draw the lid to the band, a system of levers carried by the frame for simultaneously reciprocating the pushers horizontally, another system of levers carried by the frame for simultaneously reciprocating the vacuum cups vertically, valving means for placing the cups in communication with a source of vacuum in the vicinity of the upward limit of their movement, valving means for breaking said vacuum in the vicinity of the lower limit of said movement, a common cam shaft for actuating said system of levers and valving means, and a power device for said cam shaft.

7. In ring and disc assembly apparatus, the combination of a table top, a feed conveyor belt adapted to move thereover to carry rings thereon, a stop member over the conveyor, a slide pusher at right angles to the conveyor on one side thereof adjacent said stop, a sliding connection for the pusher on the table top, a chute-like vertical magazine mounted on the table on the other side of said conveyor adjacent said stop to carry discs therein subject to the influence of gravity, a passageway beneath said magazine, a filler plate in said passageway having a surface flush with the upper surface of said conveyor belt, a discharge conveyor belt adapted to move over the table top beyond said magazine having its upper surface flush with the feed conveyor and filler plate, means for causing said pusher to transfer a ring from the feed conveyor to a temporary station beneath the magazine, means operating vertically through said ring for causing one of said discs to be deposited in said ring so temporarily stationed, and means actuated in part by a next succeeding ring for transferring the ring in which a disc has been deposited from said station to said discharge conveyor.

8. In disc assembly apparatus, the combination with a vertical magazine for a stack of discs, and vacuum cup means for withdrawing successively the lowermost disc from the magazine, wherein spring detents retain the discs yieldingly in the magazine and resiliently yield when a lowermost disc is withdrawn from the stack.

9. In disc assembly apparatus the combination with a vertical magazine for a stack of discs, and vacuum cup means for withdrawing successively the lowermost disc from the magazine, wherein the magazine has a sight opening in its front face to permit visualization of the progress of the discs therethrough and an indication of when the supply thereof becomes depleted.

10. In ring and disc assembly apparatus the combination of a table top, a feed conveyor belt adapted to move thereover to carry ring bands thereon, a stop member over the conveyor, a plurality of slide pushers at right angles to the conveyor on one side thereof adjacent said stop, sliding connections for the pushers on the table top, a plurality of chute-like vertical magazines mounted on the table on the other side of said conveyor adjacent said stop to carry discs therein subject to the influence of gravity, a passageway beneath each said magazine, a filler plate in each said passageway having a surface flush with the upper surface of said conveyor belt, a discharge conveyor belt adapted to move over the table top beyond said magazine flush with the feed conveyor and filler plate, means for causing said pushers simultaneously to transfer respectively a band from the feed conveyor to a temporary station beneath the magazine respectively, means operating vertically through each of said bands simultaneously for causing one of said discs to be deposited in each said bands so temporarily stationed, and means actuated in part by a next succeeding bands pushed through for transferring the band in which discs have been deposited from said stations to said discharge conveyor.

11. In ring and disc assembly apparatus, the combination with a stand, of ring feeding mechanism, disc feeding mechanism, a plurality of pushers, for simultaneously positioning a plurality of rings with respect to said disc feeding mechanism, a slide lever for each pusher, a common rock shaft for said levers, a plurality of vacuum cups mounted for simultaneously reciprocation through said positioned rings respectively for drawing a disc to each ring, a lifter arm for each vacuum cup, a common rock shaft for said lifter arms, a crank lever for each said rock shaft, a pitman for each crank lever, and a common cam shaft for actuating said pitmans.

12. In ring and disc assembly apparatus, the combination with a stand, of ring feeding mechanism, disc feeding mechanism, a plurality of pushers for simultaneously positioning a plurality of rings with respect to said disc feeding mechanism, a slide lever for each pusher, a common rock shaft for said levers, a plurality of vacuum cups mounted for simultaneous reciprocation through said positioned rings respectively for drawing a disc to each ring, a lifter arm for each vacuum cup, a common rock shaft for said lifter arms, a crank lever for each said rock shaft, a pitman for each crank lever, a hose connection to each vacuum cup, valving means common to the said hose connection for alternately exhausting air from and admitting into said cups, a common cam shaft for actuating said pitmans and said valving means, and means for rotating the cam shaft.

13. In ring and disc assembly apparatus, the combination of ring feeding means, disc feeding means, a vertically reciprocal vacuum cup cooperating with said disc feeding means, a hollow stem for the cup, a yoke collet on said stem, a lifter arm engaging the yoke collet, a crank lever engaging the lifter arm, a pitman engaging the crank lever, a crank disc eccentrically articulated with the pitman, a driving shaft for the crank disc, a hose pipe connected to the stem, a stationary valving member encircling said drive shaft, a rotary valving member keyed to the drive shaft in running face to face abutment with the stationary member, a port in the stationary member communicating with the hose pipe, another port therein communicating with an exhaust pump, and a third port therein open to the atmosphere, said ports opening into the face of the stationary valving member abutting the mating face of the rotary valving member, a manifold in the mating face of the rotary valving member adapted to place the ports of the stationary valving member in communication at successive intervals of rotation for making and breaking a vacuum in said cup, and a spring pressing the said valving members together, and means for operating said ring feeding means in cooperation with said disc feeding means.

14. In disc assembly apparatus, the combination of disc feeding means, a vertically reciprocal vacuum cup cooperating with said disc feeding means, a hollow stem for the cup, a yoke collet on said stem, a lifter arm engaging the yoke collet, a crank lever engaging the lifter arm, a pitman engaging the crank lever, a crank disc eccentrically articulated with the pitman, a driving shaft for the crank disc, a hose pipe connected to the stem, a stationary valving member encircling said drive shaft, a rotary valving member keyed to the drive shaft in running face to face abutment with the stationary member, a port in the stationary member communicating with the hose pipe, another port therein communicating with an exhaust pump, and a third port therein open to the atmosphere, said ports opening into the face of the stationary valving member abutting the mating face of the rotary valving member, a manifold in the mating face of the rotary valving member adapted to place the ports of the stationary valving member in communication at successive intervals of rotation for making and breaking a vacuum in said cup, a spring pressing the said valving members together, and power means for rotating said driving shaft.

15. In disc assembly apparatus, the combination of a table, a disc feeding magazine for holding a supply of superimposed discs for movement by gravity downwardly toward the table, a vacuum cup movable up and down through an aperture in the table below said magazine to contact the lowermost disc and draw it off said magazine, said vacuum cup being retractable downwardly through the aperture with the disc thereon to lower the disc onto the table, means for breaking the vacuum to permit the vacuum cup to move further downwardly through said aperture leaving the disc on the table, and a slide member for pushing the disc from under the magazine.

JOSEPH R. FLEISCH.

REFERENCES CITED

The following references are of record in the file of this patent:

UNITED STATES PATENTS

| Number | Name | Date |
|---|---|---|
| 1,694,875 | Grisman | Dec. 11, 1928 |
| 1,735,609 | Frederick | Nov. 12, 1929 |
| 1,964,434 | Holmes et al. | June 26, 1934 |
| 2,080,039 | Endaly et al. | May 11, 1937 |
| 2,183,600 | Warner et al. | Dec. 19, 1939 |
| 2,198,740 | Redman | Apr. 30, 1940 |
| 2,344,460 | Harmani | Mar. 14, 1944 |

FOREIGN PATENTS

| Number | Country | Date |
|---|---|---|
| 260,271 | Great Britain | Nov. 3, 1927 |